United States Patent [19]

Ogura

[11] Patent Number: 5,307,095
[45] Date of Patent: Apr. 26, 1994

[54] EYE-MOISTENING DEVICE
[75] Inventor: Nobunori Ogura, Tokyo, Japan
[73] Assignee: Rainbow Optical Laboratory Co., Ltd., Tokyo, Japan
[21] Appl. No.: 956,731
[22] Filed: Oct. 6, 1992

Related U.S. Application Data

[63] Continuation-in-part of Ser. No. 638,490, Jan. 8, 1991, abandoned.

[51] Int. Cl.⁵ .............................................. G02C 5/14
[52] U.S. Cl. ...................................... 351/111; 351/41; 351/158
[58] Field of Search .................... 351/41, 44, 111, 124, 351/158, 45, 62; 2/426, 442; 261/DIG. 4, DIG. 34, DIG. 41, 94, 95

[56]         References Cited
         U.S. PATENT DOCUMENTS 3,133,982  5/1964  Janz ........................................ 351/62

FOREIGN PATENT DOCUMENTS

| | | |
|---|---|---|
| 54-137049 | 9/1979 | Japan . |
| 59-9628 | 1/1984 | Japan . |
| 59-35913 | 3/1984 | Japan . |
| 61-16532 | 1/1986 | Japan . |
| 63-88825 | 6/1988 | Japan . |
| 680942 | 10/1952 | United Kingdom .................. 351/44 |

Primary Examiner—Bruce Y. Arnold
Assistant Examiner—Hung Xuan Dang
Attorney, Agent, or Firm—Cushman, Darby & Cushman

[57]            ABSTRACT

An eye-moistening device comprising spectacles includes a pair of side covers for covering at least left and right sides of eyes, and an eye-moistening member provided on the inner surface of the side cover. This eye-moistening member is adapted to be impregnated with water or medicine. This impregnated water or medicine can be slowly evaporated thereby wetting or soaking the eyes with water or medicine when the spectacles are put on one's face.

5 Claims, 5 Drawing Sheets

FIG. 7
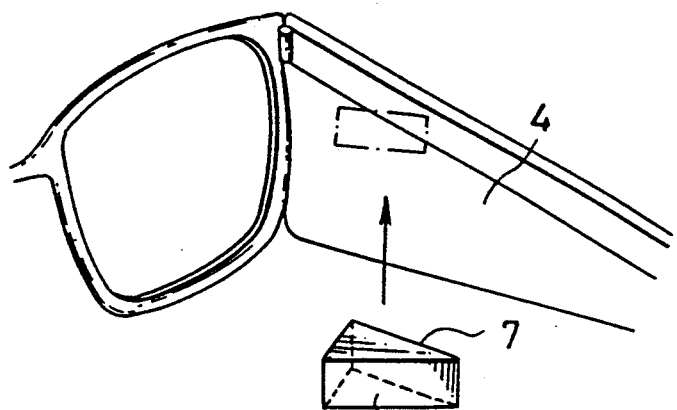
FIG. 8  FIG. 9
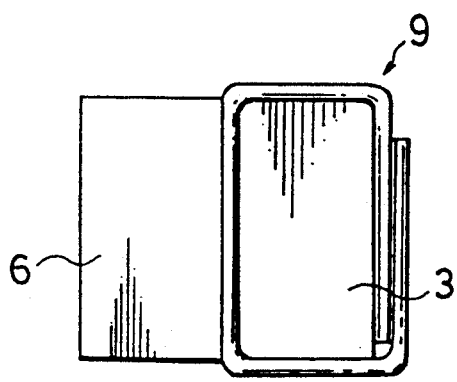 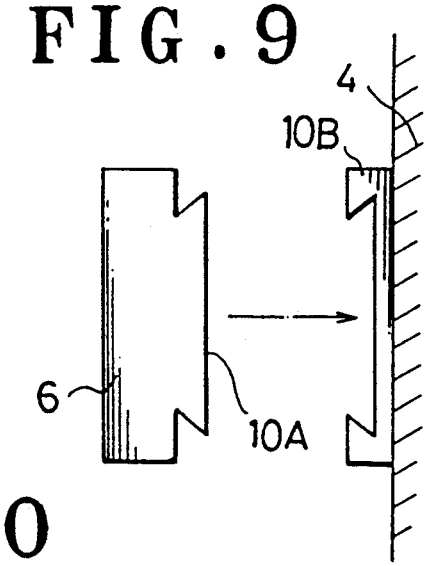
FIG. 10
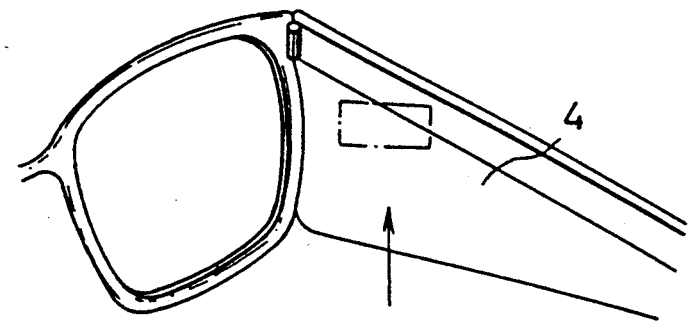
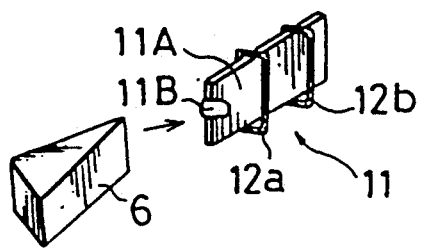

EYE-MOISTENING DEVICE

CROSS-REFERENCES TO THE RELATED APPLICATIONS

This application is a continuation-in-part of U.S. patent application Ser. No. 638,490 filed on Jan. 8, 1991 now abandoned.

BACKGROUND OF THE INVENTION (a) Field of the Invention

The present invention relates to an eye-moistening device which, when put on one's face, is adapted to moisten eyes with water and/or medicine which is slowly evaporated from the device.

(b) Description of the Prior Art

In general, spectacles comprise a pair of rims supporting lens, and a frame for attaching the spectacles to one's face.

Therefore, when the spectacles are put on one's face, the enviroment inside the spectacles near the eyes is almost the same as outer enviroment. On the other hand, in the case of spectacles such as goggles or safety spectacles, which are adapted to hermetically enclose the eyes, the environment surrounding the eyes is always the same.

When the eyes suffer from lactrimation deficiency or so-called dry eyes, which causes the eyes to feel driness or weariness, moistening in some degree of the atmosphere surrounding the eyes is found to be very effective in healing such dry eyes.

However, prior to the present invention, there has been no proposal to provide spectacles with a moistening means.

Further, in the case of ordinary spectacles, even though the forward portion of the eyes are covered with a lens, both sides of the eyes are substantially opened to the outer atmosphere through rather narrow frames of the spectacles crossing the sides of the eyes. Therefore, any dust, cigarette smoke, photochemical smog or other noxious materials are easily allowed to enter into the eyes.

SUMMARY OF THE INVENTION

Therefore, the main object of the invention is to provide an eye-moistening device, which can be attached to spectacles thereby to moisten the environment surrounding the eyes.

Another object of the present invention is to provide an eye-moistening device, which is suitable for moistening the atmosphere surrounding the eyes, and to provide spectacles attached with the eye-moistening device which is capable of preventing any foreign materials from entering into the atmosphere surrounding the eyes, or entering into the eyes.

According to the present invention, the above objects have been achieved by attaching to the spectacles a moistening means which is adapted to slowly evaporate water or medicines.

According to the present invention, there is provided an eye-moistening device comprising spectacles, and an eye-moistening means impregnated with water and/or medicine, each being disposed or carried by the spectacles which when put on one's face faces to the outer corner of the eye.

The eye-moistening device may further comprise a pair of side covers, each being attached to each of the rims or frame of the spectacles so as to cover each side of the eyes, the eye-moistening means being attached to each inner side of the spectacles or to the inner surfaces of the side covers.

In this invention, the spectacles are defined to include any type of spectacles such as goggles, safety spectacles, said eye-moistening means being disposed on an inner side wall of the goggles and the like.

The eye-moistening means may preferably be made of porous elastic or pliable material which has excellent water absorption properties, and can be atached to the inner side surface of the frames of the spectacles, or to the inner side surface of the side covers.

In another embodiment, the eye-moistening means may be formed integral with the side covers. In other words, the side covers per se are formed of a porous material, or a material having a large number of fine pores therein, so that water and/or medicine can be directly impregnated into the side covers to be subsequently evaporated at the time of use.

According to the eye-moistening device of the present invention, water and/or medicine can be slowly evaporated from the eye-moistening device so as to suitably moisten the atmosphere surrounding the eyes.

Further, when the side covers are attached to the spectacles, any foreign materials such as dust, cigarette smoke, pollen, photochemical smog or other noxious materials can be prevented from entering into the eyes.

At the same time, the vapor of water and/or medicine evaporated from the eye-moistening device can be maintained within the hollow space enclosed by the side covers so as to keep the hollow space in a condition of wet atmosphere for a long period of time.

When the eye-moistening means is detachably mounted to the spectacles or the side covers, the eye-moistening means can be removed from or attached to the spectacles or the side covers as desired, and at the same time the replenishment of the water or medicine can be easily carried out.

BRIEF DESCRIPTION OF THE DRAWING

FIG. 7 is a side view of an eye-moistening means which is provided with an attaching means;

FIGS. 8 and 9 are a side view illustrating how an eye-moistening means can be attached to the spectacles;

FIG. 10 is a perspective view showing an attachment to be mounted to the spectacles;

DESCRIPTION OF THE PREFERRED EMBODIMENT

Figure 1:
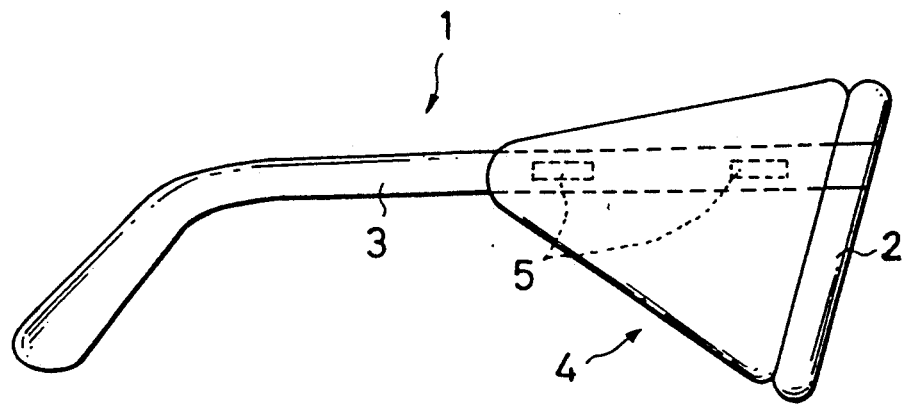
FIG. 1 is a side view of a spectacles according to the present invention.
Figure 2:
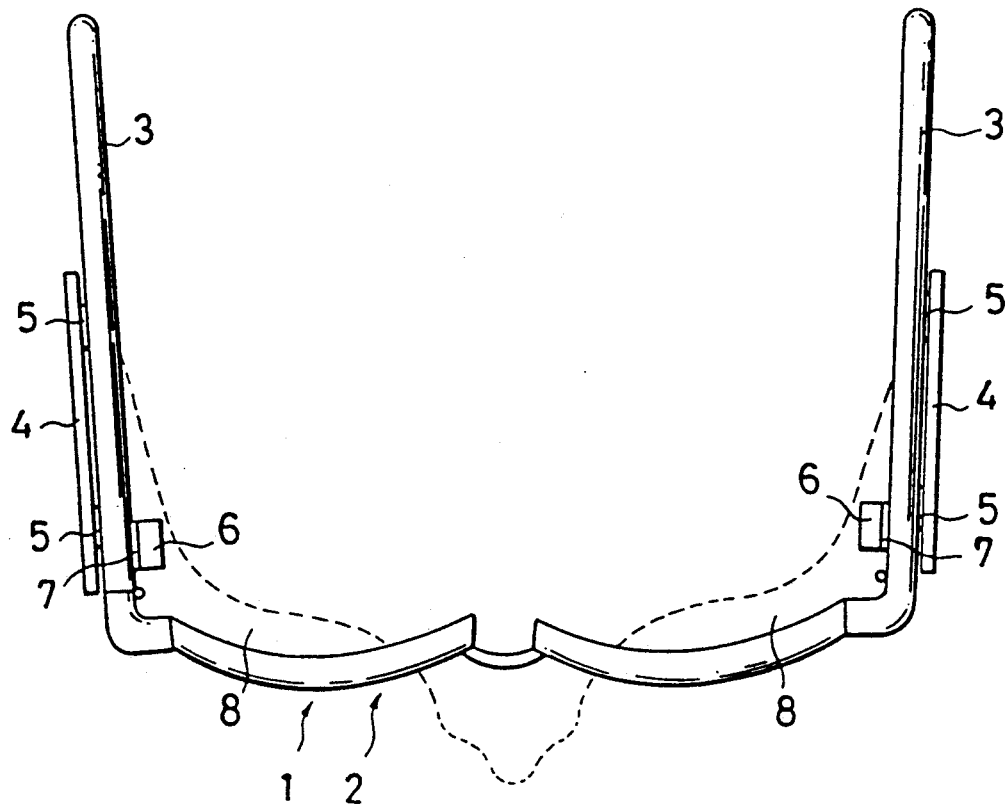
FIG. 2 is a plan view of the spectacles attached with eye-moistening means attached according to the present invention.

This invention will be further explained with reference to the drawings:

As shown in FIGS. 1 and 2, eye-moistening device according to the present invention, comprises spectacles 1, and a pair of side covers 4 detachably mounted on the spectacles 1. The spectacles 1 are spectacles of an ordinary type comprising a pair of rim portions 2, each holding a lens, and a pair of frames, one end of each frame being connected to a portion of the rim and the other end of each frame being collapsably extended backward.

The side covers 4 are made of a transparent or colored semi-transparent plastic.

The side covers 4 may be partially transparent or semi-transparent as long as the field of vision of the eyes is not hindered when the spectacles are put on one's eyes, i.e. at least a portion thereof to which the scope of the eye-sight can be extended should be transparent or semi-transparent, and other portion thereof may be opaque.

Each of the side covers 4 is of plate-like shape having a width (in the direction of height) larger than that of the frame 3 of the spectacles, and the forward end portion thereof is closely contacted with the rim 2 of the spectacles 1, while the backward portion thereof is extended along the length of the frame 3.

When this eye-moistening device is put on one's face, the eyes are enclosed by the side covers 4 and the rim portion (including the rim 2 and lens or glass sustained by the rims 2), thus forming a hollow space 8 therebetween. It is preferable that the side cover 4 is in close contact with the rims 2. However, the side cover 4 may be kept apart from the rims 2 so at to form a space therebetween.

Figure 3:
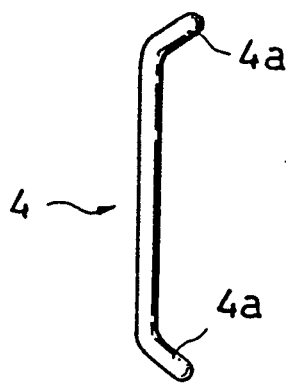
FIG. 3 is a side view of the side cover according to the present invention.

The upper and lower edge portions 4a of the side cover 4 may be slightly bent inward (or toward one's face when put thereon) as shown in FIG. 3, so as to fully cover the eyes.

The side covers 4 may be integrally formed with the frame 3 of the spectacles 1, or may be adhered by means of an adhesive or heat to the frame 3.

In the embodiment shown herein however, the side cover 4 is detachably attached to the frame 3.

More specifically, a connecting member 5 is fixed to an intermediate portion of the side covers 4 so as to be attached to the frame 3.

The connecting member 5 may be of any construction as long as it can be detachably engaged with or mounted on the frame 3.

For example, the connecting member 5 may be adhered to the frame 3 by means of an adhesive or a magnet. The connecting member 5 may be mounted not only to the side covers 4 as mentioned above, but also to the frame 3, or the connecting member 5 may be mounted on both the side cover 4 and the frame 3.

In the embodiment shown herein, a connecting member 5 consisting of a tape having an adhesive layer on both surfaces is mounted on the inner side surface of the side cover 4 so as to permit the side cover 4 to be attached to the outer side surface of the frame 3.

The connecting member 5 may be formed of a hook consisting of a U-grooved elastic member which may be fixed to the inner side surface of the cover 4, thereby allowing the connecting member 5 to be easily detachably mounted on the frame 3.

The connecting member 5 may be fixed to the outer side surface of the side cover 4 so as to permit the side cover 4 to be attached to the inner surface of the frame 3.

In the spectacles shown in FIG. 2, the side cover 4 as illustrated above is attached thereto, and a moistening member 6 is mounted via an adhesive layer 7 on the inner side of the spectacles.

In this embodiment, the moistening member 6 is formed of a porous material impregnated with water or medicine, and attached to the frame 3 of the spectacles 1. However, the moistening member 6 may be attached to the rim 2 of the spectacles 1 or to the inner wall surface of the side cover 4.

The moistening member 6 may be adhered or detachably mounted on the frame 3 or on the side cover 4. However, it is preferred that the moistening member 6 is attached to the frame 3 or to the side cover 4 via a water-resistive media.

For example, a connecting member or an adhesive layer 7 may be fixed to the frame 3 or the side cover 4 via a water-resistive layer (not shown).

The material and size of the moistening member 6 may be selected, depending on the evaporation rate as well as on the duration of use.

Generally water is impregnated into the moistening member 6. However, it is more preferable that a volatile medicine is also impregnated therein.

The moistening member 6 may be detachably mounted on the frame 3 or on the side cover 4, or may be integrally fixed thereto.

Figure 4:
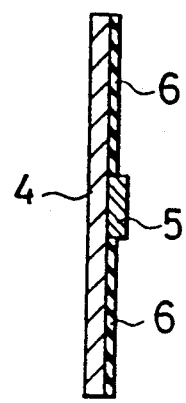
FIG. 4 is a sectional view of the side cover attached with an eye-moistening means according to the present invention.

The moistening member 6 may be, as shown in FIG. 4, formed of a porous high polymer material, and attached to part of the inner side surface of the side cover 4 via an adhesive, while leaving a substantial area of the transparent or semi-transparent portion thereof as it is.

Water impregnated in the moistening member 6 is slowly evaporated, thereby moistening the hollow space 8 defined by the rim portion and the side cover 4 to wet the eyes.

Figure 5:
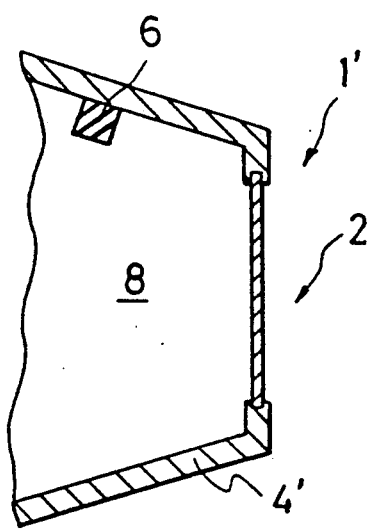
FIG. 5 is a plan view of goggles attached with an eye-moistening means according to the present invention.

The spectacles as mentioned herein include, in addition to the ordinary spectacles, any special spectacles such as goggles 1' (as shown in FIG. 5), safety spectacles and the like.

In this case also, by attaching the moistening member 6 to the inner side of the spectacles 1' (excluding the lens portion), it is possible to moisten a hollow space 8 surrounded by the rim portion 2 and wall portion 4', thereby wetting the eyes.

The shape of the moistening member is not limited in any manner, and may be of a layer formed on a portion of the side cover or on the frame of the spectacles, or of a three-dimensional body, which can be attached to a portion of the side cover 4 or to the frame 3 of the spectacles.

When it is desired to evaporate a volatile medicine, the medicine can be impregnated into the moistening member 6 made of a porous material such as activated carbon, EVA resin having fine pores, which is fixed to the inner side surface of the frame or side covers 4 as explained above, thereby allowing the medicine to be slowly evaporated therefrom.

Other principal construction of this embodiment is almost the same as that of the previous embodiment shown in FIG. 2.

When the medicine is a medicine for pollinosis, the vapor of the medicine can be entered into the eyes, and at the same time dust can be prevented from entering into the eyes, thereby alleviating the condition of pollinosis.

In the above embodiments, the side cover is mounted on both of the right and left frames. However, the side cover may be attached to only one of them.

When the side covers are attached to the spectacles, it is possible to prolong the moistened condition within the hollow space 8, and at the same time to protect the eyes from any foreign matters.

Figure 6:
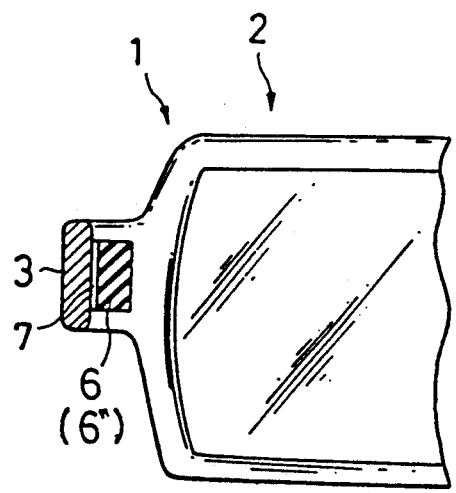
FIG. 6 is a perspective view of a portion of spectacles, wherein an eye-moistening means is provided with an adhering means.

In the embodiment shown in FIG. 6, an ordinary spectacles having no side cover is provided with a moistening member 6 or porous materials 6'', which is mounted via an adhesive layer 7 on the frame of the spectacles for evaporating a medicine.

It is desirable that the moistening member 6 or porous materials 6'' is disposed at a portion of the frame or rim portion which is close to the eyes, thereby effecting the moistening of the atmosphere surrounding the eyes and allowing the evaporated medicine to enter into the eyes.

The moistening member or porous materials may be repeatedly used by supplying water or medicine thereto, or they may be of a disposable type.

FIG. 7 illustrates an embodiment wherein an adhesive layer 7 is provided to the moistening member 6, for adhering the moistening member 6 to the side cover 4.

In this case, the moistening member 6 is of triangular shape in cross section, the forward portion thereof being made thicker thereby enhancing the water impregnation degree.

In the embodiment shown in FIG. 8, a connecting member 9 is detachably fixed to the outer side surface of the moistening member 6.

This connecting member 9 is formed of a band which is extendable upward, and is wound aroung the frame 3 of the spectacles thereby allowing the moistening member 6 to be fastened to a prescribed portion of the spectacles.

In the embodiment shown in FIG. 9, the moistening member 6 is provided with a connecting portion 10A to be engaged with a connecting member 10B mounted on the spectacles or goggles, thereby allowing the moistening member 6 to be detachably mounted on the spectacles or goggles.

In the embodiment shown in FIG. 10, a connecting member 11 is mounted on the spectacles. This connecting member 11 comprises a base plate 11A, a stopper 11B fixed to the distal end portion of the base plate 11A, and loop-like gum bands 12a and 12b fixed to the base plate 11A.

This base plate 11A is attached to the side cover or the spectacles in advance. In this case, the moistening member 6 is fastened to the connecting member 11 through the elastic force of the bands 12a and 12b.

In this case, since the moistening member 6 is not directly fixed to the spectacles, it can be easily removed if desired.

Figure 11:
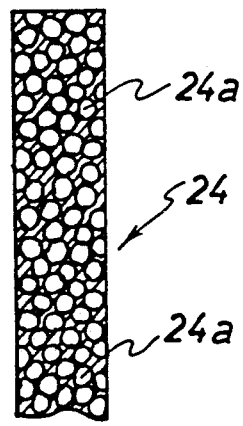
FIG. 11 is a sectional view of a side cover made of a porous material.

FIG. 11 represents another embodiment wherein a side cover 24 per se is formed of a porous material or a material having a many number of fine pores or fine passages 24a, so that water or medicine can be impregnated therein. Examples of such a porous material are silica gel or EVA (ethylene vinyl acetate) resin. Water or medicine can be impregnated into these porous materials by immersing these porous materials into water or a solution of medicine.

Figure 12:
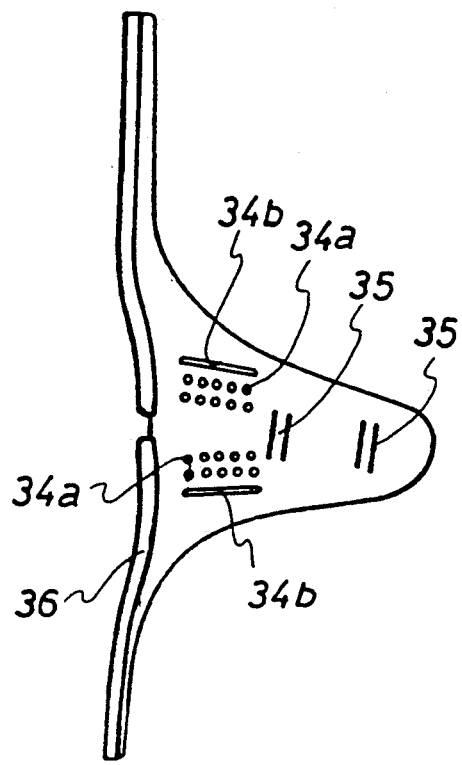
FIG. 12 is a plan view showing another embodiment of the side cover.
Figure 13:
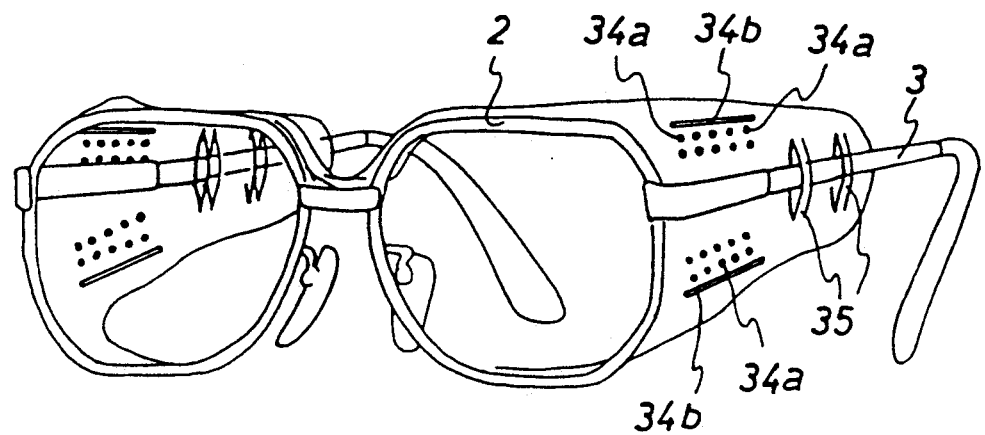
FIG. 13 is a perspective view of spectacles on which the side cover shown in FIG. 12 is mounted.

Alternatively, as shown in FIG. 12, fine through holes 34a or elongated fine through holes 34b may be formed on the inner surface of the side cover 34, so as to keep water or medicine in these through holes 34a, 34b. The side cover 34 shown in FIG. 12 is triangular in shape, and is provided at the center thereof with two pairs of slits 35 for inserting thereinto the frame 3 of the spectacles as shown in FIG. 13, as well as with an adhesive strip 36 on its one side.

Water or medical solution can be kept in these through holes 34a, 34b via surface tension of water or medical solution by immersing the side cover 34 into water or medical solution.

In either case, water or medicine impregnated in the fine pores 24a or holes 34a and 34b can be subsequently released at the time of use to moisten eye atmosphere.

The evaporation rate of water or medicine can be controlled by adjusting the number or location of the through holes 34a and 34b.

According to the present invention, since water or medicine can be evaporated from a moistening member or a porous material disposed near the eyes, it is possible to moisten the atmosphere surrounding the eyes, thereby wetting or soaking the eyes with water or medicine. Therefore, it is effective in healing the sickness of eyes, such as VDT syndrome caused from lactrimation deficiency or so-called dry eyes. Further it is also effective for alleviating the condition of pollinosis.

The provision of the side cover is effective in maintaining a desirable atmosphere surrounding the eyes, or in protecting the eyes from any foreign matters such as dust, smoke of cigarret, pollen, or photochemical smog.

I claim:

1. An eye moistening device in combination with spectacles of the type having a frame including support means for a lens system including a pair of arms for engaging the head of a wearer, said device including a side cover comprising a wall member mounted on each said head engaging arm of said frame adjacent to said lens system, said device including a liquid absorbing block having in cross-section a triangular shape including an apex at one end and base at an opposite end, attachment means carried on each arm removably attaching said liquid absorbing block to a said respective arm with a said base of each said liquid absorbing block being located adjacent said lens system to supply moisture by evaporation to the eye of a wearer.

2. The invention as claimed in claim 1 wherein said attachment means comprises an adhesive layer on each said arm, a said liquid absorbing block being attached to a said arm by engagement with one of said adhesive layers.

3. The invention as claimed in claim 1 wherein said attachment means comprises complementary interlocking portions on each said block and on each said arm.

4. The invention as claimed in claim 1 wherein said wall members each comprise extensions for wrapping about a portion of said support means for the lens system and perforations in said wall members to provide for air circulation adjacent the eyes of a wearer.

5. The invention as claimed in claim 1 wherein each said side cover is formed with a plurality of through holes for retaining a liquid.

* * * * *